United States Patent
Haderlein et al.

(10) Patent No.: US 7,705,171 B2
(45) Date of Patent: Apr. 27, 2010

(54) PROCESS FOR PRODUCING NICKEL(0)-PHOSPHORUS LIGAND COMPLEXES

(75) Inventors: Gerd Haderlein, Grünstadt (DE); Tobias Aechtner, Mannheim (DE); Andreas Leitner, Ludwigshafen (DE); Peter Pfab, Neustadt (DE); Hermann Luyken, Ludwigshafen (DE); Jens Scheidel, Hirschberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 54 days.

(21) Appl. No.: 12/279,795

(22) PCT Filed: Feb. 13, 2007

(86) PCT No.: PCT/EP2007/051374

§ 371 (c)(1),
(2), (4) Date: Aug. 18, 2008

(87) PCT Pub. No.: WO2007/096274

PCT Pub. Date: Aug. 30, 2007

(65) Prior Publication Data

US 2009/0054671 A1 Feb. 26, 2009

(30) Foreign Application Priority Data

Feb. 22, 2006 (EP) .................................. 06110259

(51) Int. Cl.
*C07F 15/04* (2006.01)
(52) U.S. Cl. ............................ 556/21; 556/13; 556/138
(58) Field of Classification Search .................. 556/13, 556/21, 138
See application file for complete search history.

(56) References Cited

U.S. PATENT DOCUMENTS

| | | | |
|---|---|---|---|
| 3,631,191 A | 12/1971 | Kane et al. | |
| 3,846,461 A | 11/1974 | Shook, Jr. | |
| 3,859,327 A | 1/1975 | Wells | |
| 4,385,007 A | 5/1983 | Shook, Jr. | |
| 2003/0100442 A1 | 5/2003 | Chu et al. | |
| 2004/0176622 A1 | 9/2004 | Bartsch et al. | |
| 2007/0083057 A1 | 4/2007 | Haderlein et al. | |
| 2007/0088173 A1 | 4/2007 | Haderlein et al. | |
| 2007/0155979 A1 | 7/2007 | Rosier et al. | |

FOREIGN PATENT DOCUMENTS

| | | |
|---|---|---|
| CA | 2552860 A1 | 8/2005 |
| CA | 2553027 A1 | 8/2005 |
| CA | 2554736 A1 | 8/2005 |
| GB | 1000477 | 8/1965 |
| WO | WO-2004/101498 A2 | 11/2004 |
| WO | WO-2005/042156 A1 | 5/2005 |
| WO | WO-2005/042157 A2 | 5/2005 |
| WO | WO-2005/073170 A1 | 8/2005 |
| WO | WO-2005/073171 A1 | 8/2005 |
| WO | WO-2005/073174 A1 | 8/2005 |

OTHER PUBLICATIONS

Mézailles et al., "Synthesis and X-ray crystal structures of dimeric nickel(0) and tetrameric copper(I) iodide complexes of 2-diphenylphosphino-3-methylphosphinine", *Journal of Organometallic Chemistry*, vol. 541, No. 1-2, pp. 277-283 (1997).
Le Floch et al., "Use of 2,2'-Biphosphinines for the Stabilization of Reduced Transition Metal Species: Electrochemical Reduction of Bis(2,2'-biphosphinine)nickel(0)", *Inorganic Chemistry*, vol. 34, No. 1, pp. 11-12 (1995).
Casalnuovo et al., "Ligand Electronic Effects in Asymmetric Catalysis: Enhanced Enantioselectivity in the Asymmetric Hydrocyanation of Vinylarenes", *Journal of the American Chemical Society*, vol. 116, pp. 9869-9882(1994).

*Primary Examiner*—Porfirio Nazario Gonzalez
(74) *Attorney, Agent, or Firm*—Connolly Bove Lodge & Hutz LLP

(57) ABSTRACT

A process for preparing nickel(0)-phosphorus ligand complexes comprising at least one nickel(0) central atom and at least one phosphorus ligand by reacting a nickel(II) compound with a reducing agent in the presence of the ligand to give a reaction mixture, wherein
a) the molar reducing agent:nickel(II) compound ratio in the reaction is from 1:1 to 1000:1, calculated as the molar ratio of the redox equivalents,
b) the molar phosphorus ligand:nickel(II) compound ratio in the reaction is not more than 30:1, calculated as the molar P atoms:Ni atoms ratio,
c) the nickel(0) content in the resulting reaction mixture is not more than 1.3% by weight and
d) the resulting reaction mixture is extracted by adding at least one dinitrile and at least one hydrocarbon to form at least two immiscible phases.

10 Claims, No Drawings

PROCESS FOR PRODUCING NICKEL(0)-PHOSPHORUS LIGAND COMPLEXES

RELATED APPLICATIONS

This application is a national stage application (under 35 U.S.C. 371) of PCT/EP2007/051374, filed Feb. 13, 2007, which claims benefit of European application 06110259.6, filed Feb. 22, 2006.

The invention relates to a process for preparing nickel(0)-phosphorus ligand complexes comprising at least one nickel (0) central atom and at least one phosphorus ligand by reacting a nickel(II) compound with a reducing agent in the presence of the ligand to give a reaction mixture, wherein a) the molar reducing agent:nickel(II) compound ratio in the reaction is from 1:1 to 1000:1, calculated as the molar ratio of the redox equivalents,
b) the molar phosphorus ligand:nickel(II) compound ratio in the reaction is not more than 30:1, calculated as the molar P atoms:Ni atoms ratio,
c) the nickel(0) content in the resulting reaction mixture is not more than 1.3% by weight and
d) the resulting reaction mixture is extracted by adding at least one dinitrile and at least one hydrocarbon to form at least two immiscible phases.

The invention further relates to mixtures which comprise nickel(0) % phosphorus ligand complexes and are obtainable by the present process, and to the use of these mixtures comprising nickel(0)-phosphorus ligand complexes as a catalyst in the hydrocyanation and isomerization of alkenes or in the hydrocyanation and isomerization of unsaturated nitrites.

The invention also relates to a process for isomerizing branched unsaturated nitriles to linear unsaturated nitrites in the presence of nickel(0)-phosphorus ligand complexes as a catalyst, which comprises preparing the nickel(0)-phosphorus ligand complexes by processes cited at the outset.

The invention finally relates to a further process for isomerizing branched unsaturated nitriles to linear unsaturated nitrites in the presence of nickel(0)-phosphorus ligand complexes as a catalyst, which comprises regenerating the nickel (0)-phosphorus ligand complexes in circulation mode in the course of performance of this process.

For hydrocyanations of alkenes, nickel complexes of phosphorus ligands are suitable catalysts. For example, nickel complexes with unidentate phosphites are known, which catalyze the hydrocyanation of butadiene to a mixture of isomeric pentenenitriles, for example linear 3-pentenenitrile and branched 2-methyl-3-butenenitrile. These catalysts are also suitable, inter alia, for the subsequent isomerization of the 2-methyl-3-butenenitrile to 3-pentenenitrile, and also for the hydrocyanation of 3-pentenenitrile to adiponitrile, an important intermediate in the preparation of polyamides.

Various processes for preparing the nickel complexes mentioned are known, including those in which a reducing agent is used:

U.S. Pat. No. 3,846,461 describes a process for preparing zero-valent nickel complexes with triorganophosphite ligands by reacting thiorganophosphite compounds with nickel chloride in the presence of a finely divided reducing agent which is more electropositive than nickel. The reaction according to U.S. Pat. No. 3,846,461 takes place in the presence of a promoter which is selected from the group consisting of $NH_3$, $NH_4X$, $Zn(NH_3)_2X_2$ and mixtures of $NH_4X$ and $ZnX_2$, where X corresponds to a halide.

New developments have shown that it is advantageous, in the hydrocyanation of alkenes, to use nickel complexes with chelate ligands (multidentate ligands), since it is possible using them to achieve both higher activities and higher selectivities with increased lifetime. The above prior art process is not suitable for preparing nickel complexes with chelate ligands. However, processes are also known with which, starting from divalent nickel compounds and chelate ligands, nickel(0) complexes with chelate ligands can be prepared by reduction. Typically, high temperatures are employed, so that thermally labile ligands in the complex decompose if appropriate.

US 2003/0100442 A1 describes a process for preparing a nickel(0) chelate complex in which, in the presence of a chelate ligand and a nitrile solvent, nickel chloride is reduced with a more electropositive metal than nickel, in particular zinc or iron. In order to achieve a high space-time yield, a molar excess of nickel salt based on the metal active as a reducing agent is used, and has to be removed again after the complexation. The process is generally performed with aqueous nickel chloride, which, especially in the case of use of hydrolysis-labile ligands, can lead to their decomposition. When anhydrous nickel chloride is employed, especially in the case of use of hydrolysis-labile ligands, it is essential according to US 2003/0100442 A1 that the nickel chloride first be dried by a specific process in which very small particles with large surface area and hence high reactivity are obtained. One disadvantage of the process is in particular that this fine dust of nickel chloride produced by spray-drying is carcinogenic. A further disadvantage of this process is that elevated reaction temperatures are generally employed, which, especially in the case of thermally labile ligands, can lead to the decomposition of the ligand or of the complex.

GB 1 000 477 and BE 621 207 relate to processes for preparing nickel (0) complexes by reducing nickel(II) compounds using phosphorus ligands.

U.S. Pat. No. 4,385,007 describes a process for preparing nickel (0) complexes which are used as catalysts in combination with organoborane as a promoter for the preparation of dintriles. In this case, the catalyst and the promoter are obtained from a catalytically active composition which has already been used in the preparation of adiponitrile by hydrocyanating pentenenitrile.

U.S. Pat. No. 3,859,327 describes a process for preparing nickel(0) complexes which are used as catalysts in combination with zinc chloride as a promoter for the hydrocyanation of pentenenitrile. In this case, nickel sources which stem from hydrocyanation reactions are used.

WO 2005/042157 A2 describes a process for preparing nickel(0)-phosphorus ligand complexes in which a nickel(II)-ether adduct is reduced in the presence of a phosphorus ligand. Useful reducing agents include metals which are more electropositive than nickel, for example zinc or iron. The molar ratio of the redox equivalents between the nickel(II) source and the reducing agent is from 1:1 to 1:100. WO 2005/042156 A1 describes a similar process starting from nickel bromide or nickel iodide. Neither document mentions a subsequent extraction of the resulting reaction mixture.

Adiponitrile is prepared by hydrocyanating butanediene in a plurality of steps. In a first step, the reaction first has to be stopped at the stage of the $C_5$ nitriles in order to remove the linear 3-pentenenitrile obtained from the branched 2-methyl-3-butenenitrile which is likewise obtained (and from which the undesired methylglutaronitrile is formed in the course of further hydrocyanation). In a second step, the removed 2-methyl-3-butenenitrile is isomerized to the linear 3-pentenenitrile. The combined 3-pentenenitrile streams are finally hydrocyanated in a third step to adiponitrile. A process for preparing linear 3-pentenenitrile is described in WO 2005/073171 A1.

WO 2005/073174 A1 describes a process for preparing 3-pentenenitrile in which the hydrocyanation of butadiene and isomerization of 2-methyl-3-butenenitrile are coupled with one another via the catalyst circuits. Pages 37 and 63-68 disclose a process step j*) in which a stream of a nickel(0) catalyst stabilized with phosphorus ligands is extracted by adding a dinitrile stream and a hydrocarbon stream to obtain two immiscible phases. On pages 37 and 52-54, step h*) is described as a catalyst regeneration by reduction with a reducing agent (metals which are more electropositive than nickel; and also metal alkyls, electrical current, complex hydrides and hydrogen). In the preparation of the catalyst complexes, a certain nickel(0) content of the resulting reaction mixture (=product) is not mentioned; the Ni(0) content mentioned on page 54 line 31 is that of the return catalyst solution used to prepare the complexes (=reactant). There is likewise no mention of splitting of the coupled process into a hydrocyanation and an isomerization proceeding separately, i.e. uncoupled therefrom.

WO 2004/101498 A2 teaches the hydrocyanation of unsaturated compounds with a catalyst composed of organophosphorus ligands and nickel, and subsequent distillation, the mixture to be distilled having a molar organophosphorus compound nickel ratio (expressed as P atoms:Ni atoms) of ≦15, and/or a nickel concentration of ≦1.3% by weight, and/or the distillation bottom temperature being ≦180° C. Although pages 6 to 7 mention an extraction step with addition of an aliphatic hydrocarbon, they do not mention the addition of a nitrile in the extraction. There is no mention of a reaction of a nickel(II) compound with a reducing agent.

WO 2005/073170 A1 discloses that the hydrocyanation stops after the first stage (obtaining the $C_5$ nitriles) when the nickel(0) catalyst does not comprise any Lewis acids. It is therefore very advantageous to use, as the catalyst for the hydrocyanation of butadiene, a nickel(0)-phosphorus ligand complex which is free of Lewis acid.

In addition, many Lewis acids are corrosive, which is why corrosion-resistant and hence expensive materials are required for the production plants for catalyst synthesis and for hydrocyanation. Lewis acid-free product streams would make construction and operation of certain parts of plants less expensive.

It was an object of the invention to remedy the disadvantages outlined and to provide an improved process for preparing nickel(0)-phosphorus ligand complexes—these are also referred to hereinafter as nickel(0) complexes or Ni(0) complexes.

In particular, the intention was to use this process to prepare mixtures (for example solutions or suspensions) comprising nickel(0)-phosphorus ligand complexes which do not comprise any Lewis acids. The Lewis acid-free catalyst was to be used in hydrocyanation reactions and isomerization reactions.

We have accordingly found the process defined at the outset for preparing the nickel(0) complexes, and also the mixtures and uses mentioned there. We have also found the processes for isomerization mentioned at the outset. Preferred embodiments of the invention can be taken from the subclaims.

All pressure data which follow are absolute pressures. Nickel(0) or Ni(0) means nickel in the zero oxidation state, and nickel(II) or Ni(II) means nickel in the +2 oxidation state.

Nickel(II) Compounds

The nickel(II) compound is preferably selected from nickel (II) halides and nickel(II)-ether adducts, in particular from nickel(II) halides and nickel(II) halide-ether adducts. Useful nickel halides are preferably nickel chloride, nickel bromide or nickel iodide or mixtures thereof.

Nickel bromide and nickel iodide may be used as such, in particular, and in contrast to nickel chloride, without the spray-drying described in US 2003/0100442 A1. For nickel bromide and nickel iodide, a drying process is superfluous, since the reactivity of these nickel sources is attained irrespective of the crystal size. However, drying is not disadvantageous.

In the process according to the invention, nickel bromide and nickel iodide may each be used as the anhydrate or hydrate. In the context of the present invention, a hydrate of nickel bromide or iodide is understood to mean a di- or hexahydrate or an aqueous solution. Preference is given to the use of anhydrates of nickel bromide or iodide in order to substantially prevent hydrolysis of the ligand.

Nickel chloride is preferably used in dried form, in particular spray-dried as described in the US document. Alternatively, it is possible to dry by azeotropic distillation, as described in detail in WO 20051042549 A1 and below:

In the azeotropic distillation, aqueous nickel(II) halide is used. Aqueous nickel(II) halide is a nickel halide which is selected from the group of nickel chloride, nickel bromide and nickel iodide which comprises at least 2% by weight of water. Examples of these are nickel chloride dihydrate, nickel chloride hexahydrate, an aqueous solution of nickel chloride, nickel bromide trihydrate, an aqueous solution of nickel bromide, nickel iodide hydrates or an aqueous solution of nickel iodide. In the case of nickel chloride, preference is given to using nickel chloride hexahydrate or an aqueous solution of nickel chloride. In the case of nickel bromide and nickel iodide, preference is given to using the aqueous solutions. Particular preference is given to an aqueous solution of nickel chloride.

In the case of an aqueous solution, the concentration of the nickel(II) halide in water is not critical per se. An advantageous proportion of the nickel(II) halide in the total weight of nickel(II) halide and water has been found to be at least 0.01% by weight, preferably at least 0.1% by weight, more preferably at least 0.25% by weight, especially preferably at least 0.5% by weight, and at most 80% by weight, preferably at most 60% by weight, more preferably at most 40% by weight. For practical reasons, it is advantageous not to exceed a proportion of nickel halide in the mixture of nickel halide and water which, under the given temperature and pressure conditions, gives rise to a homogeneous solution in the sense that no undissolved solid remains. In the case of an aqueous solution of nickel chloride, it is therefore advantageous for practical reasons to select, at room temperature (20° C.), a proportion of nickel chloride in the total weight of nickel chloride and water of at most 31% by weight. At other temperatures, other concentrations can correspondingly be selected. Which arise from the solubility of nickel chloride in water at the particular temperature.

The aqueous nickel(II) halide is dried by an azeotropic distillation. In a preferred embodiment, the azeotropic distillation is a process for removing water from the corresponding aqueous nickel(II) halide, the latter being mixed with a diluent whose boiling point, in the case that the diluent does not form an azeotrope with water under the pressure conditions of the distillation mentioned below, is higher than the boiling point of water and which is present in liquid form at this boiling point of water, or which forms an azeotrope or heteroazeotrope with water under the pressure and temperature conditions of the distillation mentioned below, and the mixture comprising the aqueous nickel(II) halide and the diluent is distilled with removal of water or of the azeotrope mentioned or of the heteroazeotrope of this mixture mentioned to obtain an anhydrous mixture M comprising nickel(II) halide and said diluent.

The starting mixture to be distilled may, in addition to the aqueous nickel(II) halide, comprise further constituents such as ionic or nonionic, organic or inorganic compounds, especially those which are homogeneously and monophasically miscible with the starting mixture or are soluble in the starting mixture.

Preference is given to admixing the aqueous nickel(II) halide with a diluent whose boiling point under the pressure conditions of the distillation is higher than the boiling point of water and which is present at this boiling point of water. The pressure conditions for the downstream distillation are not critical per se. Advantageous pressures have been found to be at least $10^{-4}$ MPa, preferably at least $10^{-3}$ MPa, in particular at least $5 \cdot 10^{-3}$ MPa. Advantageous pressures have been found to be at most 1 MPa, preferably at most $5 \cdot 10^{-1}$ MPa, in particular at most $1.5 \cdot 10^{-1}$ MPa.

Depending on the pressure conditions and the composition of the mixture to be distilled, the distillation temperature is then established. At this temperature, the diluent is preferably in liquid form. In the context of the present invention, the term diluent refers either to an individual diluent or to a mixture of diluents, in which case the physical properties mentioned in the case of such a mixture in the present invention relate to this mixture.

In addition, the diluent preferably has a boiling point under these pressure and temperature conditions which, in the case that the diluent does not form an azeotrope with water, is higher than that of water, preferably by at least 5° C., in particular at least 20° C., and preferably at most 200° C., in particular at most 100° C.

In a preferred embodiment, diluents may be used which form an azeotrope or heteroazeotrope with water. The amount of diluent compared to the amount of water in the mixture is not critical per se. Advantageously, more liquid diluent should be used than corresponds to the amount to be distilled off by the azeotropes, so that excess diluent remains as the bottom product.

When a diluent is used which does not form an azeotrope with water, the amount of diluent compared to the amount of water in the mixture is not critical per se.

The diluent used is selected in particular from the group consisting of organic nitrites, aromatic hydrocarbons, aliphatic hydrocarbons and mixtures of the aforementioned solvents. With regard to the organic nitriles, preference is given to acetonitrite, propionitrile, n-butyronitrile, n-valeronitrile, cyanocyclopropane, acrylonitrile, crotonitrile, allyl cyanide, cis-2-pentenenitrile, trans-2-pentenenitrile, cis-3-pentenenitrile, trans-3-pentenenitrile, 4-pentenenitrile, 2-methyl-3-butenenitrile, Z-2-methyl-2-butenenitrile, E-2-methyl-2-butenenitrile, ethylsuccinonitrile, adiponitrile, methylglutaronitrile or mixtures thereof. With regard to the aromatic hydrocarbons, benzene, toluene, o-xylene, m-xylene, p-xylene or mixtures thereof may preferably be used. Aliphatic hydrocarbons may preferably be selected from the group of the linear or branched aliphatic hydrocarbons, more preferably from the group of the cycloaliphatics, such as cyclohexane or methylcyclohexane, or mixtures thereof. Particular preference is given to using cis-3-pentenenitrile, trans-3-pentenenitrile, adiponitrile, methylglutaronitrile or mixtures thereof as the solvent.

When the diluent used is an organic nitrile or mixtures comprising at least one organic nitrile, it has been found to be advantageous to select the amount of diluent in such a way that the proportion of nickel(II) halide in the total weight of nickel(II) halide and diluent in the finished mixture is at least 0.05% by weight, preferably at least 0.5% by weight, more preferably at least 1% by weight, and equally advantageously at most 50% by weight, preferably at most 30% by weight, more preferably at most 20% by weight and in particular at most 10% by weight.

The mixture comprising the aqueous nickel(II) halide and the diluent is distilled to remove water from this mixture and to obtain an anhydrous mixture M comprising nickel(II) halide and said diluent. In a preferred embodiment, the mixture is first prepared and then distilled. In another preferred embodiment, the aqueous nickel halide, more preferably the aqueous solution of the nickel halide, is added gradually to the boiling diluent during the distillation. This allows the formation of a greasy solid which is difficult to handle from a process technology point of view to be substantially prevented.

In the case of pentenenitrile as the diluent, the distillation can advantageously be carried out at a pressure of at most 200 kPa, preferably at most 100 kPa, in particular at most 50 kPa, more preferably at most 20 kPa, and equally preferably at a pressure of at least 1 kPa, preferably at least 5 kPa, more preferably 10 kPa.

The distillation can advantageously be effected by single-stage evaporation, preferably by fractional distillation in one or more, for example two or three, distillation apparatuses. Useful apparatus for the distillation is that which is customary for this purpose, as described, for example, in Kirk-Othmer, Encyclopedia of Chemical Technology, 3rd Ed., Vol. 7, John Wiley & Sons, New York, 1979, page 870-881, such as sieve-tray columns, bubble-cap tray columns, columns with structured packing, columns with random packing, columns with side draw or dividing wall columns. The distillation can be effected batchwise or continuously.

Suitable nickel(II)-ether adducts are preferably anhydrous adducts. The nickel(II)-ether adduct preferably comprises a nickel(II) halide, preferably nickel chloride, nickel bromide and nickel iodide. Particular preference is given to nickel chloride.

The nickel(II)-ether adduct preferably comprises an oxygen-containing, sulfur-containing or mixed oxygen- and sulfur-containing ether. It is preferably selected from the group consisting of tetrahydrofuran, dioxane, diethyl ether, di-n-propyl ether, diisopropyl ether, di-n-butyl ether, di-sec-butyl ether, ethylene glycol dialkyl ether, diethylene glycol dialkyl ether and triethylene glycol dialkyl ether.

The ethylene glycol dialkyl ethers used are preferably ethylene glycol dimethyl ether (1,2-dimethoxyethane, glyme) and ethylene glycol diethyl ether. The diethylene glycol dialkyl ether used is preferably diethylene glycol dimethyl ether (diglyme). The triethylene glycol dialkyl ether used is preferably triethylene glycol dimethyl ether (triglyme).

Particularly preferred nickel(II)-ether adducts are nickel (II) chloride-ethylene glycol dimethyl ether adduct ($NiCl_2$.dme), the nickel(II) chloride-dioxane adduct ($NiCl_2$.dioxane) and the nickel(II)bromide-ethylene glycol dimethyl ether adduct ($NiBr_2$.dme). Particular preference is given to the use of $NiCl_2$.dme which can be prepared, for example, according to Example 2 of DE-A 2 052 412. In this case, nickel chloride dihydrate is reacted with triethyl orthoformate as a dehydrating agent in the presence of 1,2-dimethoxyethane. Alternatively, the reaction can also be carried out with the aid of trimethyl orthoformate. The adducts $NiCl_2$·dioxane and $NiBr_2$·dme can be prepared in analogous reactions, dioxane being used instead of 1,2-dimethoxyethane and nickel bromide hydrate instead of nickel chloride hydrate.

In a preferred embodiment of the present invention, the nickel(II)-ether adduct is prepared by admixing an aqueous solution of the nickel halide with the particular ether and the diluent, if appropriate with stirring, and then removing water and any excess ether. The diluent is preferably selected from the group of solvents suitable for complex formation above. Water and any excess ether are preferably removed by distillation. A detailed description of the nickel(II)-ether adduct synthesis can be taken from the WO 2005/042157 A2 mentioned at the outset.

It is possible to use the nickel(II)-ether adduct directly in the solution or suspension thus obtained to prepare the nickel (0)-phosphorus ligand complexes. Alternatively, the adduct can also be isolated first and dried if appropriate and be dissolved again or resuspended to prepare the nickel(0)-phosphorus ligand complex. The adduct can be isolated from the suspension by processes known per se to those skilled in the art, such as filtration, centrifugation, sedimentation or by hydrocyclones, as described, for example, in Ullmann's Encyclopedia of Industrial Chemistry, Unit Operation I, Vol. B2, VCH, Weinheim, 1988, in chapter 10, pages 10-1 to 10-59, chapter 11, pages 11-1 to 11-27 and chapter 12, page 12-1 to 12-61.

Catalysts and Ligands

The nickel(0)-phosphorus, ligand complexes comprise at least one nickel(0) central atom and at least one phosphorus ligand. Typically, the catalyst mixture used in the hydrocyanation or isomerization described also comprises free (not bonded to the nickel complex) phosphorus ligands.

The phosphorus ligands of the nickel(0) complexes and the free phosphorus ligands are preferably selected from phosphines, phosphites, phosphinites and phosphonites. The ligands may be mono- or bidentate.

The phosphorus ligands preferably have the formula I $$P(X^1R^1)(X^2R^2)(X^3R^3) \tag{1}$$

In the context of the present invention, compound I is understood to mean a single compound or a mixture of different compounds of the aforementioned formula.

The $X^1$, $X^2$, $X^3$ groups are each independently oxygen or a single bond. If all of the $X^1$, $X^2$ and $X^3$ groups are single bonds, compound I is a phosphine of the formula $P(R^1R^2R^3)$ with the definitions of $R^1$, $R^2$ and $R^3$ specified in this description.

If two of the $X^1$, $X^2$ and $X^3$ groups are single bonds and one is oxygen, compound I is a phosphinite of the formula $P(OR^1)(R^2)(R^3)$ or $P(R^1)(OR^2)(R^3)$ or $P(R^1)(R^2)(OR^3)$ with the definitions of $R^1$, $R^2$ and $R^3$ specified below.

If one of the $X^1$, $X^2$ and $X^3$ groups is a single bond and two are oxygen, compound I is a phosphonite of the formula $P(OR^1)(OR^2)(R^3)$ or $P(R^1)(OR^2)(OR^3)$ or $P(OR^1)(R^2)(OR^3)$ with the definitions of $R^1$, $R^2$ and $R^3$ specified in this description.

In a preferred embodiment, all $X^1$, $X^2$ and $X^3$ groups should be oxygen, so that compound I is advantageously a phosphite of the formula $P(OR^1)(OR^2)(OR^3)$ with the definitions of $R^1$, $R^2$ and $R^3$ specified below.

$R^1$, $R^2$, $R^3$ are each independently identical or different organic radicals. $R^1$, $R^2$ and $R^3$ are each independently alkyl radicals preferably having from 1 to 10 carbon atoms, such as methyl, ethyl, n-propyl, i-propyl, n-butyl, i-butyl, s-butyl, t-butyl, aryl groups such as phenyl, o-tolyl, m-tolyl, p-tolyl, 1-naphthyl, 2-naphthyl, or hydrocarbyl, preferably having from 1 to 20 carbon atoms, such as 1,1'-biphenol, 1,1'-binaphthol. The $R^1$, $R^2$ and $R^3$ groups may be bonded together directly, i.e. not solely via the central phosphorus atom. Preference is given to the $R^1$, $R^2$ and $R^3$ groups not being bonded together directly.

In a preferred embodiment, $R^1$, $R^2$ and $R^3$ groups are radicals selected from the group consisting of phenyl, o-tolyl, m-tolyl and p-tolyl. In a particularly preferred embodiment, a maximum of two of the $R^1$, $R^2$ and $R^3$ groups should be phenyl groups.

In another preferred embodiment, a maximum of two of the $R^1$, $R^2$ and $R^3$ groups should be o-tolyl groups.

Particularly preferred compounds I which may be used are those of the formula Ia $$\text{(o-tolyl-O-)}_w\text{(m-tolyl-O-)}_x\text{(p-tolyl-O-)}_y\text{(phenyl-O-)}_z P \tag{Ia}$$

where w, x, y, z are each a natural number where $w+x+y+z=3$ and $w, z \leq 2$.

Such compounds Ia are, for example, (p-tolyl-O-)(phenyl-O—)$_2$P, (m-tolyl-O-)-(phenyl-O—)$_2$P, (o-tolyl-O-)(phenyl-O—)$_2$P, (p-tolyl-O-)$_2$(phenyl-O—)P, (m-tolyl-O-)$_2$(phenyl-O—)P, (o-tolyl-O-)$_2$(phenyl-O—)P, (m-tolyl-O-)(p-tolyl-O-)(phenyl-O—)P, (o-tolyl-O-)(p-tolyl-O—)(phenyl-O—)P, (o-tolyl-O-)(m-tolyl-O-)(phenyl-O—)P, (p-tolyl-O—)$_3$P, (m-tolyl-O-)(p-tolyl-O—)$_2$P, (o-tolyl-O-)(p-tolyl-O—)$_2$P, (m-tolyl-O-)$_2$(p-tolyl-O—)P, (o-tolyl-O-)$_2$(p-tolyl-O—)P, (o-tolyl-O—)(m-tolyl-O-)(p-tolyl-O—P, (m-tolyl-O—)$_3$P, (o-tolyl-O-)(m-tolyl-O—)$_2$P, (o-tolyl-O-)$_2$(m-tolyl-O—)P or mixtures of such compounds.

For example, mixtures comprising (m-tolyl-O—)$_3$P, (m-tolyl-O-)$_2$(p-tolyl-O—)P, (m-tolyl-O-)(p-tolyl-O—)$_2$P and (p-tolyl-O—)$_3$P can be obtained by reacting a mixture comprising m-cresol and p-cresol, in particular in a molar ratio of 2:1, as obtained in the distillative workup of crude oil, with a phosphorus trihalide, such as phosphorus trichloride.

In another, likewise preferred embodiment, the phosphorus ligands are the phosphites, described in detail in DE-A 199 53 058, of the formula Ib:

$$P(O-R^1)_x(O-R^2)_y(O-R^3)_z(O-R^4)_p \tag{Ib}$$

where $R^1$: aromatic radical having a $C_1$-$C_{18}$-alkyl substituent in the o-position to the oxygen atom which joins the phosphorus atom to the aromatic system, or having an aromatic substituent in the o-position to the oxygen atom which joins the phosphorus atom to the aromatic system, or having a fused aromatic system in the o-position to the oxygen atom which joins the phosphorus atom to the aromatic system, $R^2$: aromatic radical having a $C_1$-$C_{18}$-alkyl substituent in the m-position to the oxygen atom which joins the phosphorus atom to the aromatic system, or having an aromatic substituent in the m-position to the oxygen atom which joins the phosphorus atom to the aromatic system, or having a fused aromatic system in the m-position to the oxygen atom which joins the phosphorus atom to the aromatic system, the aromatic radical bearing a hydrogen atom in the o-position to the oxygen atom which joins the phosphorus atom to the aromatic system, $R^3$: aromatic radical having a $C_1$-$C_{18}$-alkyl substituent in the p-position to the oxygen atom which joins the phosphorus atom to the aromatic system, or having an aromatic substituent in the p-position to the oxygen atom which joins the phosphorus atom to the aromatic system, the aromatic radical bearing a hydrogen atom in the o-position to the oxygen atom which joins the phosphorus atom to the aromatic system, $R^4$: aromatic radical which bears substituents other than those defined for $R^1$, $R^2$ and $R^3$ in the o-, m- and p-position to the oxygen atom which joins the phosphorus atom to the aromatic system, the aromatic radical bearing a hydrogen atom in the o-position to the oxygen atom which joins the phosphorus atom to the aromatic system, x: 1 or 2, y, z, p: each independently 0, 1 or 2, with the proviso that x+y+z+p=3.

Preferred phosphites of the formula Ib can be taken from DE-A 199 53 058. The $R^1$ radical may advantageously be o-tolyl, o-ethylphenyl, o-n-propylphenyl, o-isopropylphenyl, o-n-butylphenyl, o-sec-butylphenyl, o-tert-butylphenyl, (o-phenyl)phenyl or 1-naphthyl groups.

Preferred $R^2$ radicals are m-tolyl, m-ethylphenyl, m-n-propylphenyl, m-isopropylphenyl, m-n-butylphenyl, m-sec-butylphenyl, m-tert-butylphenyl, (m-phenyl)phenyl or 2-naphthyl groups.

Advantageous $R^3$ radicals are p-tolyl, p-ethylphenyl, p-n-propylphenyl, p-isopropylphenyl, p-n-butylphenyl, p-sec-butylphenyl, p-tert-butylphenyl or (p-phenyl)phenyl groups.

The $R^4$ radical is preferably phenyl. p is preferably zero. For the indices x, y and z and p in compound Ib, there are the following possibilities:

| x | y | z | p |
|---|---|---|---|
| 1 | 0 | 0 | 2 |
| 1 | 0 | 1 | 1 |
| 1 | 1 | 0 | 1 |
| 2 | 0 | 0 | 1 |
| 1 | 0 | 2 | 0 |
| 1 | 1 | 1 | 0 |
| 1 | 2 | 0 | 0 |
| 2 | 0 | 1 | 0 |
| 2 | 1 | 0 | 0 |

Preferred phosphites of the formula Ib are those in which p is zero, and $R^1$, $R^2$ and $R^3$ are each independently selected from o-isopropylphenyl, m-tolyl and p-tolyl, and $R^4$ is phenyl.

Particularly preferred phosphites of the formula Ib are those in which $R^1$ is the o-isopropylphenyl radical, $R^2$ is the m-tolyl radical and $R^3$ is the p-tolyl radical with the indices specified in the table above; also those in which $R^1$ is the o-tolyl radical, $R^2$ is the m-tolyl radical and $R^3$ is the p-tolyl radical with the indices specified in the table; additionally those in which $R^1$ is the 1-naphthyl radical, $R^2$ is the m-tolyl radical and $R^3$ is the p-tolyl radical with the indices specified in the table; also those in which $R^1$ is the o-tolyl radical, $R^2$ is the 2-naphthyl radical and $R^3$ is the p-tolyl radical with the indices specified in the table; and finally those in which $R^1$ is the o-isopropylphenyl radical, $R^2$ is the 2-naphthyl radical and $R^3$ is the p-tolyl radical with the indices specified in the table; and also mixtures of these phosphites.

Phosphites of the formula Ib may be obtained by i) reacting a phosphorus trihalide with an alcohol selected from the group consisting of $R^1OH$, $R^2OH$, $R^3OH$ and $R^4OH$ or mixtures thereof to obtain a dihalophosphorous monoester, ii) reacting the dihalophosphorous monoester mentioned with an alcohol selected from the group consisting of $R^1OH$, $R^2OH$, $R^3OH$ and $R^4OH$ or mixtures thereof to obtain a monohalophosphorous diester and iii) reacting the monohalophosphorous diester mentioned with an alcohol selected from the group consisting of $R^1OH$, $R^2OH$, $R^3OH$ and $R^4OH$ or mixtures thereof to obtain a phosphite of the formula Ib.

The reaction may be carried out in three separate steps. Equally, two of the three steps may be combined, i.e. i) with ii) or ii) with iii). Alternatively, all of steps i), ii) and iii) may be combined together. Suitable parameters and amounts of the alcohols selected from the group consisting of $R^1OH$, $R^2OH$, $R^3OH$ and $R^4OH$ or mixtures thereof may be determined readily by a few simple preliminary experiments.

Useful phosphorus trihalides are in principle all phosphorus trihalides, preferably those in which the halide used is Cl, Br, I, in particular Cl, and mixtures thereof. It is also possible to use mixtures of different identically or differently halogen-substituted phosphines as the phosphorus trihalide. Particular preference is given to $PCl_3$. Further details on the reaction conditions in the preparation of the phosphites Ib and for the workup can be taken from DE-A 199 53 058.

The phosphites Ib may also be used in the form of a mixture of different phosphites Ib as a ligand. Such a mixture may be obtained, for example, in the preparation of the phosphites Ib.

However, preference is given to the phosphorus ligand being multidentate, in particular bidentate. The ligand used therefore preferably has the formula II

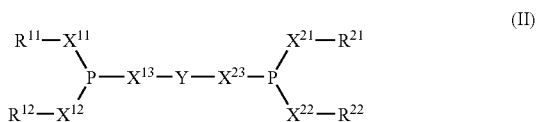

where $X^{11}$, $X^{12}$, $X^{13}$, $X^{21}$, $X^{22}$, $X^{23}$ are each independently oxygen or a single bond $R^{11}$, $R^{12}$ are each independently identical or different, separate or bridged organic radicals $R^{21}$, $R^{22}$ are each independently identical or different, separate or bridged organic radicals, Y is a bridging group.

In the context of the present invention, compound II is a single compound or a mixture of different compounds of the aforementioned formula.

In a preferred embodiment, $X^{11}$, $X^{12}$, $X^{13}$, $X^{21}$, $X^{22}$, $X^{23}$ may each be oxygen. In such a case, the bridging group Y is bonded to phosphite groups.

In another preferred embodiment, $X^{11}$ and $X^{12}$ may each be oxygen and $X^{13}$ a single bond, or $X^{11}$ and $X^{13}$ each oxygen and $X^{12}$ a single bond, so that the phosphorus atom surrounded by $X^{11}$, $X^{12}$ and $X^{13}$ is the central atom of a phosphonite. In such a case, $X^{21}$, $X^{22}$ and $X^{23}$ May each be oxygen, or $X^{21}$ and $X^{22}$ may each be oxygen and $X^{23}$ a single bond, or $X^{21}$ and $X^{23}$ may each be oxygen and $X^{22}$ a single bond, or $X^{23}$ may be oxygen and $X^{21}$ and $X^{22}$ each a single bond, or $X^{21}$ may be oxygen and $X^{22}$ and $X^{23}$ each a single bond, or $X^{21}$, $X^{22}$ and $X^{23}$ may each be a single bond, so that the phosphorus atom surrounded by $X^{21}$, $X^{22}$ and $X^{23}$ may be the central atom of a phosphite, phosphonite, phosphinite or phosphine, preferably a phosphonite.

In another preferred embodiment, $X^{13}$ may be oxygen and $X^{11}$ and $X^{12}$ each a single bond, or $X^{11}$ may be oxygen and $X^{12}$ and $X^{13}$ each a single bond, so that the phosphorus atom surrounded by $X^{11}$, $X^{12}$ and $X^{13}$ is the central atom of a phosphonite. In such a case, $X^{21}$, $X^{22}$ and $X^{23}$ may each be oxygen, or $X^{23}$ may be oxygen and $X^{21}$ and $X^{22}$ each a single bond, or $X^{21}$ may be oxygen and $X^{22}$ and $X^{23}$ each a single bond, or $X^{21}$, $X^{22}$ and $X^{23}$ may each be a single bond, so that the phosphorus atom surrounded by $X^{21}$, $X^{22}$ and $X^{23}$ may be the central atom of a phosphite, phosphinite or phosphine, preferably a phosphinite.

In another preferred embodiment, $X^{11}$, $X^{12}$ and $X^{13}$ may each be a single bond, so that the phosphorus atom surrounded by $X^{11}$, $X^{12}$ and $X^{13}$ is the central atom of a phosphine. In such a case, $X^{21}$, $X^{22}$ and $X^{23}$ may each be oxygen, or $X^{21}$, $X^{22}$ and $X^{23}$ may each be a single bond, so that the phosphorus atom surrounded by $X^{21}$, $X^{22}$ and $X^{23}$ may be the central atom of a phosphate or phosphine, preferably a phosphine.

The bridging group Y is preferably an aryl group which is substituted, for example by $C_1$-$C_4$-alkyl, halogen, such as fluorine, chlorine, bromine, halogenated alkyl, such as trifluoromethyl, aryl, such as phenyl, or is unsubstituted, preferably a group having from 6 to 20 carbon atoms in the aromatic system, in particular pyrocatechol, bis(phenol) or bis(naphthol).

The $R^{11}$ and $R^{12}$ radicals may each independently be identical or different organic radicals. Advantageous $R^{11}$ and $R^{12}$ radicals are aryl radicals, preferably those having from 6 to 10 carbon atoms, which may be unsubstituted or mono- or polysubstituted, in particular by $C_1$-$C_4$-alkyl, halogen, such as fluorine, chlorine, bromine, halogenated alkyl, such as trifluoromethyl, aryl, such as phenyl, or unsubstituted aryl groups.

The $R^{21}$ and $R^{22}$ radicals may each independently be identical or different organic radicals. Advantageous $R^{21}$ and $R^{22}$ radicals are aryl radicals, preferably those having from 6 to 10 carbon atoms, which may be unsubstituted or mono- or polysubstituted, in particular by $C_1$-$C_4$-alkyl, halogen, such as fluorine, chlorine, bromine, halogenated alkyl, such as trifluoromethyl, aryl, such as phenyl, or unsubstituted aryl groups.

The $R^{11}$ and $R^{12}$ radicals may each be separate or bridged. The $R^{21}$ and $R^{22}$ radicals may also each be separate or bridged. The $R^{11}$, $R^{12}$, $R^{21}$ and $R^{22}$ radicals may each be separate, two may be bridged and two separate, or all four may be bridged, in the manner described.

In a particularly preferred embodiment, useful compounds are those of the formula I, II, III, IV and V specified in U.S. Pat. No. 5,723,641. In a particularly preferred embodiment, useful compounds are those of the formula I, II, III, IV, V, VI and VII specified in U.S. Pat. No. 5,512,696, in particular the compounds used there in examples 1 to 31. In a particularly preferred embodiment, useful compounds are those of the formula I, II, III, IV, V, VI, VII, VIII, IX, X, XI, XII, XIII, XIV and XV specified in U.S. Pat. No. 5,821,378, in particular the compounds used there in examples 1 to 73.

In a particularly preferred embodiment, useful compounds are those of the formula I, II, III, IV, V and VI specified in U.S. Pat. No. 5,512,695, in particular the compounds used there in examples 1 to 6. In a particularly preferred embodiment, useful compounds are those of the formula I, II, III, IV, V, VI, VII, VIII, IX, X, XI, XII, XIII and XIV specified in U.S. Pat. No. 5,981,772, in particular the compounds used there in examples 1 to 66.

In a particularly preferred embodiment, useful compounds are those specified in U.S. Pat. No. 6,127,567 and the compounds used there in examples 1 to 29. In a particularly preferred embodiment, useful compounds are those of the formula I, II, III, IV, V, VI, VII, VIII, IX and X specified in U.S. Pat. No. 6,020,516, in particular the compounds used there in examples 1 to 33. In a particularly preferred embodiment, useful compounds are those specified in U.S. Pat. No. 5,959,135, and the compounds used there in examples 1 to 13.

In a particularly preferred embodiment, useful compounds are those of the formula I, II and III specified in U.S. Pat. No. 5,847,191. In a particularly preferred embodiment, useful compounds are those specified in U.S. Pat. No. 5,523,453, in particular the compounds illustrated there in formula 1, 2, 3, 4, 5, 6, 7, 8, 9, 10, 11, 12, 13, 14, 15, 16, 17, 18, 19, 20 and 21. In a particularly preferred embodiment useful compounds are those specified in WO 01/14392, preferably the compounds illustrated there in formula V, VI, VII, VIII, IX, X, XI, XII, XIII, XIV, XV, XVI, XVII, XXI, XXII, XXIII.

In a particularly preferred embodiment, useful compounds are those specified in WO 98/27054. In a particularly preferred embodiment, useful compounds are those specified in WO 99/13983. In a particularly preferred embodiment, useful compounds are those specified in WO 99/64155.

In a particularly preferred embodiment, useful compounds are those specified in the German patent application DE 100 380 37. In a particularly preferred embodiment, useful compounds are those specified in the German patent application DE 100 460 25. In a particularly preferred embodiment, useful compounds are those specified in the German patent application DE 101 502 85.

In a particularly preferred embodiment, useful compounds are those specified in the German patent application DE 101 502 86. In a particularly preferred embodiment, useful compounds are those specified in the German patent application DE 102 071 65. In a further particularly preferred embodiment of the present invention, useful phosphorus chelate ligands are those specified in US 2003/0100442 A1.

In a further particularly preferred embodiment of the present invention, useful phosphorus chelate ligands are those specified in the German patent application DE 103 50 999.

The compounds I, Ia, Ib and II described and their preparation are known per se. The phosphorus ligands used may also be mixtures comprising at least two of the compounds I, Ia, Ib and II.

The phosphorus ligands are preferably chelate phosphites or chelate phosphonites or mixtures thereof.

In a particularly preferred embodiment of the process according to the invention, the phosphorus ligand of the nickel(0) complex and/or the free phosphorus ligand is selected from tritolyl phosphite, bidentate phosphorus chelate ligands and the phosphites of the formula Ib

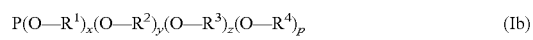

where $R^1$, $R^2$ and $R^3$ are each independently selected from o-isopropylphenyl, m-tolyl and p-tolyl, $R^4$ is phenyl; x is 1 or 2, and y, z, p are each independently 0, 1 or 2 with the proviso that x+y+z+p=3; and mixtures thereof.

In the process according to the invention, the ligand to be used may also stem from a ligand solution which has already been used as a catalyst solution in hydrocyanation reactions or isomerization reactions. This "return catalyst solution" usable as a reactant has been depleted in nickel(0) and generally has the following composition:

from 2 to 60% by weight, in particular from 10 to 40% by weight of pentene nitriles, from 0 to 60% by weight, in particular from 0 to 40% by weight of adiponitrile, from 0 to 10% by weight, in particular from 0 to 5% by weight of other nitriles, from 10 to 90% by weight, in particular from 50 to 90% by weight of phosphorus ligand and from 0 to 2% by weight, in particular from 0 to 1% by weight of nickel(0).

The free ligand present in the return catalyst solution may thus be converted back to a nickel(0) complex at least partly by the process according to the invention. This is also referred to as regeneration of the catalyst.

Reducing Agent

The reducing agent used in the process according to the invention is preferably selected from metals which are more electropositive than nickel, metal alkyls, electrical current, complex hydrides and hydrogen.

The reducing agents used are preferably metals which are more electropositive than nickel. This metal is preferably selected from the group consisting of sodium, lithium, potassium, magnesium, calcium, barium, strontium, titanium, vanadium, iron, cobalt, copper, zinc, cadmium, aluminum, gallium, indium, tin, lead and thorium. Particular preference is given here to iron and zinc.

When the reducing agent used is aluminum metal, it is advantageous when it is preactivated by reaction with a catalytic amount of mercury(II) salt or metal alkyl. For the preactivation, preference is given to using triethylaluminum or another metal alkyl in an amount of preferably from 0.05 to 50 mol %, more preferably from 0.5 to 10 mol %, based on the amount of aluminum metal.

The reducing agent is preferably finely divided, the expression "finely divided" meaning that the metal is used in a particle size of not more than 200 μm, preferably not more than 100 μm. The maximum particle size can be adjusted, for example, by sieving-off with mesh widths in the size mentioned, or other customary processes.

When the reducing agent used in the process according to the invention is metal alkyls, they are preferably lithium alkyls, sodium alkyls, magnesium alkyls, especially Grignard reagents, zinc alkyls or aluminum alkyls. Particular preference is given to aluminum alkyls such as trimethylaluminum, triethylaluminum, triisopropylaluminum or mixtures thereof, in particular triethylaluminum.

Electrical current as a reducing agent, i.e. an electrochemical reduction of Ni(II), is described, inter alia, in Corain et al., Inorg. Chim. Acta 1978, 26, 37, and in U.S. Pat. No. 5,679, 237 A and WO 97/24184. To apply the electrical current, customary electrodes may be used. The process proposed in WO 01/14392 A1 for electrochemical preparation of Ni(0)-phosphite or -diphosphite complexes in an undivided electrolysis cell is likewise possible; in this case, nickel is first brought into solution as Ni(II) by dissolving a nickel electrode and then reduced to the Ni(0) complex in the presence of the ligand.

When the reducing agents used in the process according to the invention are complex hydrides, preference is given to using metal aluminum hydrides in particular alkali metal aluminum hydrides such as lithium aluminum hydrides, or metal borohydrides, preferably alkali metal borohydrides such as sodium borohydride.

When hydrogen is used as the reducing agent, it is preferably distributed in the reaction mixture by means of suitable gas introduction devices.

The reducing agents mentioned may be used in substance or dissolved or dispersed in an inert organic solvent such as hexane, heptane or toluene.

Step a) of the Preparation of the Nickel(0)-Phosphorus Ligand Complexes

According to the invention, the nickel(II) compound is reacted with the reducing agent in the presence of the phosphorus ligands. This gives a reaction mixture which comprises the nickel(0)-phosphorus ligand complex. According to the invention, the process satisfies the conditions a) to d) mentioned at the outset. Condition a) is a) the molar reducing agent:nickel(II) compound ratio in the reaction is from 1:1 to 1000:1, calculated as the molar ratio of the redox equivalents.

The formulation "molar reducing agent:nickel(II) compound ratio, calculated as the molar ratio of the redox equivalents" will be illustrated with reference to two examples: when the reducing agent used is zinc metal, one Zn(0) is oxidized to Zn(II) for each Ni(II) which is reduced to Ni(0). When the molar zinc metal:nickel(II) compound ratio, calculated as the molar ratio of the redox equivalents, is, for example, to be 1.5:1, 1.5 mol of zinc metal has to be used per 1 mol of Ni(II) compound.

When the reducing agent used is the complex metal hydride lithium aluminum hydride $Li^{(I)}Al^{(III)}H^{(-I)}_4$ two $H(-I)$ are oxidized to $H(0)$ for each Ni(II) which is reduced to Ni(0). When the molar lithium aluminum hydride:nickel(II) compound ratio, calculated as the molar ratio of the redox equivalents, is again to be 1.5:1, 3 mol of $H(-I)$ have to be used per one mol of Ni(II) compound. 3 mol $H(-I)$ correspond to 34 mol (0.75 mol) of $LiAlH_4$; consequently, 0.75 mol of $LiAlH_4$ have to be used per 1 mol of Ni(II) compound in this example.

The molar reducing agent:nickel(II) compound ratio is preferably from 1:1 to 5:1, again calculated as the molar ratio of the redox equivalents. In particular, this molar ratio is from 1:1 to 2:1. An "equimolar" molar ratio of exactly 1:1 is useful especially in the case of batchwise performance of the process according to the invention (batch mode). In the case of continuous performance of the process, the reducing agent is preferably used in excess and the molar ratio mentioned is preferably from 1.2:1 to 2:1.

It has been found that, surprisingly, troublesome rag formation does not occur in the subsequent extraction (step d) of the process according to the invention) when the molar ratios mentioned in a) are maintained. Rag is understood to mean a region of incomplete phase separation between upper phase and lower phase in an extraction, usually a liquid/liquid mixture in which solids can also be dispersed. Excess rag formation is undesired since it hinders the extraction and, under some circumstances, the extraction apparatus can become flooded by rag, as a result of which it can no longer fulfill its separating task. When the molar reducing agent:Ni(II) compound ratios are maintained, the desired full phase separation occurs already after a short time or even spontaneously.

The process according to the invention is preferably carried out in the presence of a solvent. The solvent is in particular selected from the group consisting of organic nitriles and aromatic or aliphatic hydrocarbons. The organic nitriles used are preferably acetonitrile, propionitrile, n-butyronitrile, n-valeronitrile, cyanocyclopropane, acrylonitrile, crotonitrile, allyl cyanide, cis-2-pentenenitrile, trans-2-pentenenitrile, cis-3-pentenenitrile, trans-3-pentenenitrile, 4-pentenenitrile, 2-methyl-3-butenenitrile, Z-2-methyl-2-butenenitrile, E-2-methyl-2-butenenitrile, ethylsuccinonitrile, adiponitrile, methylglutaronitrile or mixtures thereof. Useful aromatic hydrocarbons preferably include benzene, toluene, o-xylene, m-xylene, p-xylene or mixtures thereof. Aliphatic hydrocarbons may preferably be selected from the group of the linear or branched aliphatic hydrocarbons, more preferably from the group of the cycloaliphatics such as cyclohexane or methylcyclohexane, or mixtures thereof. Particular preference is given to using cis-3-pentenenitrile, trans-3-pentenenitrile, adiponitrile, methylglutaronitrile or mixtures thereof as solvents. Preference is given to using a chemically inert solvent.

When the nickel(II) compound used is an anhydrous mixture M which has been obtained by azeotropic distillation and comprises nickel halide and a diluent (on this subject, see above), the solvent may be this diluent.

If a solvent is used, its amount is preferably from 10 to 90% by weight, more preferably from 20 to 70% by weight, in particular from 30 to 60% by weight, based in each case on the finished reaction mixture. The content of the ligand in the solvent is preferably from 1 to 90% by weight, more preferably from 5 to 80% by weight, in particular from 50 to 80% by weight.

The temperature in the reaction is typically from 30 to 140° C., preferably from 40 to 120° C. and more preferably from 50 to 10° C. It is also possible to work at higher temperatures, although a reaction at low temperature is advisable especially in the case of use of thermally labile ligands, for example chelate ligands (alone or in a mixture with other ligands).

The pressure for the reaction is typically not critical. For practical reasons, for example, pressures in the range from 0.1 to 5 bar, preferably from 0.5 to 1.5 bar are selected.

The process according to the invention is preferably carried out under inert gas, for example argon or nitrogen. The reaction can be carried out batchwise (batch mode) or continuously in all reactors suitable for this purpose. Suitable reactors are in particular well-mixed reactors in which the reaction mixture is kept in motion by stirring, pumped circulation, introduction of inert gases or other customary measures.

Optional Reducing Agent Removal and Optional Treatment with Ammonia or Amine

When the reducing agent has not been used in an equimolar amount—i.e. in a molar ratio of 1:1 to the nickel(II) compound, calculated as redox equivalents; see above—an excess of reducing agent is present in the reaction mixture after the reaction. This reducing agent excess can be removed from the reaction mixture if desired.

For solids removal, it is possible to use customary processes, for example filtration, crossflow filtration, centrifugation, sedimentation, classification or decanting, for which common apparatus such as filters (e.g. belt filters), centrifuges, hydrocyclones or other classification apparatus or decanters can be used. In the case of removal by sedimentation, the sedimented reducing agent excess can be left in the reactor and used in a regeneration. In the case of removal by belt filters, hydrocyclones or similar apparatus, the reducing agent excess removed can be returned partly or fully directly into the process.

Temperature and pressure in the optional solids removal are typically not critical. For example, it is possible to work within the temperature and pressure ranges mentioned above. In particular, it is advisable to maintain the abovementioned temperature conditions when using thermally labile ligands or in the event of risk of Ni(0) deposition, as described, for example, in the WO 2004/101498 A2 mentioned.

If the reducing agents used are metals, they are oxidized to metal compounds which can act as a Lewis acid, for example zinc chloride, iron(II) chloride or zinc bromide. If desired, the resulting reaction mixture can be reacted with ammonia or a primary, secondary or tertiary aromatic, alkyl aromatic, aliphatic or cycloaliphatic amine. The Lewis acidic metal compounds form sparingly soluble adducts which can subsequently be removed. For example, $ZnCl_2$ and ammonia form sparingly soluble $ZnCl_2.2NH_3$. This embodiment has the advantage that less Lewis acid has to be removed in the subsequent extraction step d).

The amines used are monoamines, diamines, triamines or higher-functionality amines (polyamines). The monoamines typically have alkyl radicals, aryl radicals or arylalkyl radicals having from 1 to 30 carbaro atoms; suitable monoamines are, for example, primary amines, e.g. monoalkylamines, secondary or tertiary amines, e.g. dialkylamines. Suitable primary monoamines are, for example, butylamine, cyclohexylamine, 2-methylcyclohexylamine, 3-methylcyclohexylamine, 4-methylcyclohexylamine, hexylamine, pentylamine, benzylamine, tetrahydrofurfurylamine and furfurylamine. Useful secondary monoamines include, for example, diethylamine, dibutylamine, di-n-propylamine and N-methylbenzylamine. Suitable tertiary amines are, for example, trialkylamines with $C_{1-10}$-alkyl radicals, such as trimethylamine, triethylamine or tributylamine.

Suitable diamines are, for example, those of the formula $R^1$—NH—$R^2$—NH—$R^3$ where $R^1$, $R^2$ and $R^3$ are each independently hydrogen or an alkyl radical, aryl radical or arylalkyl radical having from 1 to 20 carbon atoms. The alkyl radical may be linear or, especially for $R^2$, also cyclic. Suitable diamines are, for example, ethylenediamine, propylenediamines (1,2-diaminopropane and 1,3-diaminopropane), N-methylethylenediamine, piperazine, tetramethylenediamine (1,4-diaminobutane), N,N'-dimethylethylenediamine, N-ethylethylenediamine, 1,5-diaminopentane, 1,3-diamino-2,2-diethylpropane, 1,3-bis(methylamino)propane, hexamethylenediamine (1,6-diaminohexane), 1,5-diamino-2-methylpentane, 3-(propylamino)propylamine, N,N'-bis-(3-aminopropyl)piperazine, N,N'-bis-(3-aminopropyl)piperazine and isophoronediamine (IPDA). Suitable triamines, tetramines and higher-functionality amines are, for example, tris(2-aminoethyl)amine, tris(2-aminopropyl)amine, diethylenetriamine (DETA), triethylenetetramine (TETA), tetraethylenepentamine (TEPA), isopropylenetriamine, dipropylenetriamine and N,N'-bis(3-aminopropylethylenediamine). Aminobenzylamines and aminohydrazides having two or mere amino groups are likewise suitable.

Of course, it is also possible to use mixtures of ammonia with one or more amines, or mixtures of a plurality of amines. Preference is given to using ammonia or aliphatic amines, especially trialkylamines having from 1 to 10 carbon atoms in the alkyl radical, for example trimethylamine, triethylamine or tributylamine, and also diamines such as ethylendiamine, hexamethylenediamine or 1,5-diamino-2-methylpentane.

The amount of the ammonia or amine, when used, depends upon factors including the type and amount of the nickel(0) catalysts and/or of the ligands. The upper limits of this molar ratio is generally uncritical and is, for example, 100:1; however, the excess of ammonia or amine should not be so great that the Ni(0) complex or its ligands decompose. The temperature in the treatment with ammonia or amine is typically not critical and is, for example, from 10 to 140° C., preferably from 20 to 100° C. and in particular from 20 to 90° C. The pressure too is generally not critical.

The ammonia or the amine may be added to the reaction effluent in gaseous or liquid form (under pressure), or dissolved in a solvent. Suitable solvents are, for example, nitrites, especially those which are present in the hydrocyanation, and also aliphatic, cycloaliphatic or aromatic hydrocarbons, as used as extractants in the process according to the invention, for example cyclohexane, methylcyclohexane, n-heptane or n-octane.

The optional addition of ammonia or amine is effected in customary apparatus, for example those for gas introduction or in liquid mixers. The solid which precipitates out in many cases can either remain in the reaction effluent, i.e. a suspension is fed to the extraction in step b), or removed in a customary manner, for example as has been described above for the removal of excess reducing agent.

Conditions b) and c) in the Reaction

The process according to the invention also has to satisfy conditions b) and c):

b) the molar phosphorus ligand:nickel(II) compound ratio in the reaction (of the nickel(II) compound with the reducing agent in the presence of the ligand) is not more than 30:1, calculated as the molar P atoms:Ni atoms ratio, and c) the nickel(0) content in the resulting reaction mixture is not more than 1.3% by weight.

According to condition b), the molar phosphorus ligand:nickel(II) compound ratio is 30:1 or lower. The phosphorus ligand is expressed as the number of phosphorus atoms. The term "phosphorus ligand" of condition b) is understood to mean the entirety of all phosphorus ligands, specifically mono- and multidentate, for example monodentate and bidentate ligands. The nickel(II) compound is expressed as the number of nickel(II) atoms. The expression "molar phosphorus ligand:nickel(II) compound ratio, calculated as the molar P atoms:Ni atoms ratio" is accordingly, expressed in shortened form as the P:Ni atomic ratio.

With regard to condition b), the molar ratio mentioned (P:Ni) is preferably not more than 25:1, in particular not more than 20:1. It is likewise preferably at least 5:1.

Regarding condition c), the nickel(0) content in the resulting reaction mixture is preferably not more than 1.0% by weight. It is equally preferably at least 0.1% by weight.

The molar ratio of the nickel(II) compound to phosphorus-containing monodentate or phosphorus-containing multidentate ligand is likewise more preferably in each case from 1:1 to 1:100, preferably from 1:2 to 1:50 and in particular from 1:4 to 1:20. This ratio is thus not, like condition b), based on the entirety of all phosphorus ligands, but rather either exclusively on the monodentate or exclusively on the multidentate ligands.

Step d) of the Preparation of the Nickel(0)-Phosphorus Ligand Complexes

In the process according to the invention, moreover, d) the resulting reaction mixture is extracted by adding at least one dinitrile and at least one hydrocarbon to form at least two immiscible phases.

Before the extraction, excess reducing agent can be removed as described above from the reaction mixture to be extracted in step d). Additionally or alternatively, the reaction mixture to be extracted can be treated with ammonia or amine before the extraction and sparingly soluble Lewis acidic adducts can be removed if appropriate as described above.

Suitable dinitriles are preferably $C_6$ dinitriles, especially preferably adiponitrile, 2-methylglutaronitrile, 2-ethylsuccinonitrile, 2,3-dimethylsuccinonitrile or mixtures thereof. Adiponitrile is particularly preferred.

The hydrocarbon is the extractant. It typically has a boiling point of at least 30° C., preferably at least 60° C., in particular at least 90° C., and typically at most 140° C., preferably at most 135° C., in particular at most 130° C., in each case at a pressure of $10^5$ Pa absolute.

Suitable hydrocarbons are described, for example, in U.S. Pat. No. 3,773,809, column 3, line 50-62. Useful hydrocarbons are preferably hydrocarbons selected from cyclohexane, methylcyclohexane, cycloheptane, n-hexane, n-heptane, isomeric heptanes, n-octane, isooctane, isomeric octanes such as 2,2,4-trimethylpentane, cis- and trans-decalin, or mixtures thereof, especially of cyclohexane, methylcyclohexane, n-heptane, isomeric heptanes, n-octane, isomeric octanes such as 2,2,4-trimethylpentane, or mixtures thereof. Particular preference is given to using cyclohexane, methylcyclohexane, n-heptane or n-octane.

Very particular preference is given to n-heptane or n-octane. In the case of these hydrocarbons, the undesired rag formation is particularly low.

The hydrocarbon used is preferably anhydrous, anhydrous meaning a water content of below 100 ppm by weight, preferably below 50 ppm by weight, in particular below 10 ppm by weight. The hydrocarbon can be dried by suitable processes known to those skilled in the art, for example by adsorption or azeotropic distillation. The drying can be effected in a step preceding the extraction step d).

The amounts of the dinitrile or hydrocarbon added in step d) should be selected such that a phase separation occurs. Suitable amounts may, if appropriate, be determined by simple preliminary experiments. The amount of the nitrile added is preferably minimized, and particular preference is given to adding just as much dinitrile as is required to achieve phase separation.

The extraction can be carried out batchwise (batch mode) or continuously in all apparatus suitable for this purpose. In the case of continuous performance of the process, the content in the reaction mixture of dinitriles after addition of the dinitrile should generally be greater than 50% by weight, preferably greater than 70% by weight. Processes for preparing dinitriles, in particular $C_6$ dinitriles, are known per se. One possible such process is described in DE-A-10 2004 004683.

The extraction generally forms, at a temperature T, a first phase which is enriched in the Ni(0) complexes and ligands mentioned relative to the reaction mixture to be extracted (which is the feed in the case of continuous extraction) and a second phase which is enriched in dinitriles relative to the reaction mixture to be extracted (the feed). Usually, the first phase is the lighter phase, i.e. the upper phase, and the second phase the heavier phase, i.e. the lower phase.

After the phase separation, the upper phase comprises typically between 50 and 99% by weight, preferably between 60 and 97% by weight, in particular between 80 and 95% by weight, of the hydrocarbon used for the extraction. Consequently, the upper phase is generally the hydrocarbon phase and the lower phase the dinitrile phase.

During the extraction, the nickel(0)-phosphorus ligand complex is distributed between the two phases according to the distribution equilibrium. In order to reduce the losses of nickel(0)-phosphorus ligand complex in the case of continuous configuration of the process, the hydrocarbon can be added at a feed point which is closer to the outlet point of the lower phase (dinitrile phase) than to the feed point of the reaction mixture. The feed point of the nitrile is preferably closer to the outlet point of the upper phase (hydrocarbon phase) than the feed point of the reaction mixture.

In this context, "closer" is to be understood in the sense of the number of theoretical plates between two points. Between the feed points of the reaction mixture and of the hydrocarbon, generally from 0 to 10, preferably from 1 to 7, theoretical extraction (separating) stages are present (re-extraction zone for the catalyst), between the feed points of the reaction mixture and of the dinitrile, generally from 1 to 10, preferably from 1 to 5, theoretical extraction (separating) stages are present. The preferred number of stages mentioned arise from economic considerations; in principle, higher numbers of stages are also possible and, if appropriate, advisable for the achievement of better removal.

The Lewis acid which is present in the reaction mixture to be extracted remains preferably for the most part and more preferably fully in the lower phase. Here, fully means that the residual concentration of the Lewis acid in the upper phase is preferably less than 1% by weight, more preferably less than 0.5% by weight, in particular less than 500 ppm by weight.

The lower phase of the extraction can be worked up in a suitable manner, so that the dinitriles present therein can be used again as feeds to the extraction. Such a workup can be effected, for example, by distillation, as described in DE-A 10 2004 004683 for stream 7 from step c).

For the extraction, it is possible, for example, to use a countercurrent extraction column which may have a re-extraction zone. However, combinations having the same type of action of customary apparatus known to those skilled in the art are also suitable, for example countercurrent extraction columns, mixer-settler batteries or combinations of mixer-settler batteries with columns. It is also possible to connect two or more countercurrent extraction columns in series. Particular preference is given to the use of countercurrent extraction columns which are equipped especially with sheet metal packings as dispersing elements. In a further particularly preferred embodiment, the extraction is performed in countercurrent in compartmented, stirred extraction columns.

Regarding the direction of dispersion, the hydrocarbon is preferably used as the continuous phase and the reaction mixture to be extracted as the disperse phase. This generally shortens the phase separation time and reduces rag formation. However, the reverse direction of dispersion is also possible, i.e. reaction mixture to be extracted as the continuous phase and hydrocarbon as the disperse phase. The latter is especially true when rag formation is reduced or entirely suppressed by preceding solid removal (see above), higher temperature in the extraction or phase separation or use of a suitable hydrocarbon. Typically, the direction of dispersion more favorable for the separating performance of the extraction apparatus is selected.

In the extraction, a phase ratio of generally from 0.1 to 10, more preferably from 0.4 to 3.5, in particular from 0.75 to 2.5, in each case calculated as the ratio of mass of hydrocarbon supplied to mass of the reaction mixture to be extracted, is used.

The pressure during the extraction is typically from 10 kPa to 1 MPa, preferably from 50 kPa to 0.5 MPa, in particular from 75 kPa to 0.25 MPa.

The extraction is carried out appropriately at a temperature of from −15 to 120° C., in particular from 20 to 100° C. and more preferably from 30 to 80° C. It has been found that rag formation is lower at higher temperature of the extraction.

The phase separation can be considered as the last part of the extraction in terms of space and time depending on the apparatus configuration. For the phase separation, it is typically possible to select a wide pressure, concentration and temperature range, and the parameters optimal for the particular composition of the reaction mixture can be determined easily by a few simple preliminary experiments.

The temperature T in the phase separation is typically at least 0° C., preferably at least 10° C., more preferably at least 20° C. Typically, it is at most 120° C., preferably at most 100° C., more preferably at most 95° C. For example, the phase separation is carried out at from 0 to 100° C., preferably from 30 to 80° C.

The pressure in the phase separation is generally at least 1 kPa, preferably at least 10 kPa, more preferably 20 kPa. In general, it is at most 2 MPa, preferably at most 1 MPa, more preferably at most 0.5 MPa.

The phase separation time, i.e. the time span after the mixing of the reaction mixture to be extracted with the hydrocarbon (extractant) up to the formation of a uniform upper phase and of a uniform lower phase, can vary within wide limits. The phase separation time is generally from 0.1 to 60 min, preferably from 1 to 30 min and in particular from 2 to 10 min. In the case of industrial scale performance of the process according to the invention, a phase separation time of not more than 15 min, in particular not more than 10 min, is typically advisable in technical and economic terms.

It has been found that the phase separation time, especially in the case of use of long-chain aliphatic alkanes such as n-heptane or n-octane as the hydrocarbon, is reduced in an advantageous manner.

The phase separation can be carried out in one or more of the apparatuses known to those skilled in the art for such phase separations. In an advantageous embodiment, the phase separation can be carried out in the extraction apparatus, for example in one or more mixer-settler combinations or by equipping an extraction column with a calming zone.

The phase separation affords two liquid phases of which one phase has a higher proportion of the nickel(0) complex with phosphorus ligands and/or free phosphorus ligands, based on the total weight of this phase, than the other phase. The other phase has been enriched in Lewis acids. The phase enriched with the nickel(0) complex or the ligands is typically the lighter phase (hydrocarbon phase); the phase enriched with Lewis acids is generally the heavier phase (dinitrile phase).

In general, on completion of phase separation, the upper phase is separated from the lower phase. In the case of continuous configuration, this is done in a simple manner by drawing off each of the phases by means of a dedicated outlet point. In the process, that phase in which the nickel(0)-phosphorus ligand complexes have been enriched relative to the reaction mixture is preferably removed.

Mixtures Comprising Nickel(0) Complexes and Their Use

The mixtures which are obtainable by the process according to the invention and comprise the nickel(0)-phosphorus ligand complexes described likewise form part of the subject-matter of the invention. In addition, the mixtures may, for example, comprise free phosphorus ligands.

The nickel(0)-phosphorus ligand complex may be used directly in the form of the phase removed after the extraction and phase separation, i.e. dissolved or dispersed in the hydrocarbon. This mixture is a mixture in the sense of the preceding paragraph.

Alternatively, the nickel(0) complex may be used as such, for which it is removed from the resulting solution or dispersion. The removal is effected by removing the solvent or dispersant (the hydrocarbon) in a customary manner, for example by distillation or other separating processes. When the nickel(0) complex is present as a solid, it can also be removed by the processes for solids removal described above.

In the course of the removal of the hydrocarbon used for the extraction, for example by distillation, preference is given to adding a diluent which has a higher boiling point than the hydrocarbon. This diluent keeps the catalyst remaining in the distillation bottoms in solution and is preferably selected from the group comprising pentenenitrile isomers and dinitriles. The diluents used are more preferably the isomers of pentenenitrile, in particular 4-pentenenitrile, trans-3-pentenenitrile, cis-3-pentenenitrile, c is 2-pentenenitrite and trans-2-pentenenitrile The inventive mixtures comprising the nickel(0) complex may preferably be used as a catalyst in the hydrocyanation and isomerization of alkenes or in the hydrocyanation and isomerization of unsaturated nitriles. This use likewise forms part of the subject-matter of the invention.

The mixtures may preferably be used in the hydrocyanation of butadiene to pentenenitriles mentioned. Accordingly, in the preferred use, the alkene is 1,3-butadiene and is hydrocyanated to pentenenitriles. The hydrocyanation can be effected, for example, by the process described in the WO 2005/073171 A1; or by the process disclosed in WO 2005/073174 A1, in which the hydrocyanation is coupled with isomerization by virtue of a common catalyst circuit.

The mixtures may equally preferably be used in the isomerization of 2-methyl-3-pentenenitrile to 3-pentenenitrile mentioned. Consequently, in the preferred use, the unsaturated nitrile is preferably 2-methyl-3-butenenitrile and is isomerized to linear 3-pentenenitrile.

Process for Isomerizing Branched Nitrites

The invention also provides two related processes for isomerizing (isomerization processes) branched unsaturated nitrites to linear unsaturated nitrites in the presence of nickel (0)-phosphorus ligand complexes as a catalyst.

In the first isomerization process, the nickel(0)-phosphorus ligand complexes are prepared by the process according to the invention for preparing the nickel(0)-phosphorus ligand complexes.

The invention accordingly provides a (first) process for isomerizing branched unsaturated nitrites to linear unsaturated nitrites in the presence of nickel(0)-phosphorus ligand complexes as a catalyst, which comprises preparing the nickel(0)-phosphorus ligand complexes by the process described above (process of claims 1 to 10).

An essential part of this first isomerization process is the extraction step d) described above.

In the second isomerization process, the nickel(0)-phosphorus ligand complexes are regenerated in circulation mode in the course of performance of the isomerization process. The regeneration has already been mentioned above.

The invention consequently also provides a (second) process for isomerizing branched unsaturated nitrites to linear unsaturated nitrites in the presence of nickel(0)-phosphorus ligand complexes as a catalyst, which comprises regenerating the nickel(0)-phosphorus ligand complexes in circulation mode in the course of performance of this process (i.e. of the process for isomerization).

This (second) isomerization process preferably has an extraction step as described above as step d).

Accordingly, both isomerization processes have an extraction step d). In both isomerization processes, step d) is preferably configured such that not just the Lewis acid is removed in the preparation or regeneration of the nickel(0) catalysts but also certain undesired compounds which cause incorrect activity in the course of the isomerization. These undesired compounds are referred to hereinafter as troublesome compounds.

In both isomerization processes, it has been found to be advantageous, in the case of continuous performance of extraction step d), to add a portion of the hydrocarbon used for the extraction actually to the feed (i.e. to the reaction mixture). This is referred to hereinafter as preliminary mixing.

The preliminary mixing reduces the viscosity of the feed, which eases the extraction. The portion of the hydrocarbon metered in the preliminary mixing is, for example, from 3 to 40% by weight, in particular from 5 to 20% by weight, of the total amount of hydrocarbon used in preliminary mixing and extraction.

The extraction step improved by isomerization processes can be undertaken in the apparatus described above, for example extraction columns. Preference is given to using stirred columns. Regarding the direction of dispersion, preference is given to using the hydrocarbon as the continuous phase and the reaction mixture to be extracted as the disperse phase. However, the reverse direction of dispersion is also possible, i.e. reaction mixture to be extracted as the continuous phase and hydrocarbon as the disperse phase, but not preferred.

The reaction mixture to be extracted in extraction step (d) of the two isomerization processes may also be a mixture which comprises a return catalyst solution (described above) and a solution of the freshly prepared or regenerated catalyst. The mixing ratio of return catalyst solution:solution of the fresh or regenerated catalyst is, for example, from 99:1 to 0.5:1, preferably from 95:1 to 1:1, calculated as the mass of the solution.

In the extraction step of the isomerization process, the content of pentenenitriles in the mixture to be extracted (which is the feed) is preferably, minimized. For example, it is not more than 5% by weight of the mixture to be extracted (of the feed).

In the extraction step of the two isomerization processes, generally from 1 to 10, preferably from 2 to 7, theoretical extraction (separation) stages are present between the feed points of the reaction mixture and of the hydrocarbon (re-extraction zone for the catalyst); between the feed points of the reaction mixture and of the nitrile, generally from 1 to 10, preferably from 2 to 5, theoretical extraction (separating) stages are present. As already mentioned above, the preferred numbers of stages mentioned are economically advantageous, but higher numbers of stages may also be viable.

Under the extraction conditions described above, the troublesome compounds, just like the Lewis acid, accumulate in the lower phase (dinitrile phase) and can be removed together in this way, i.e. no additional process step for removing the troublesome compounds is required.

Both isomerization processes mentioned are suitable in particular for isomerizing 2-methyl-3-pentenenitrile to linear 3-pentenenitrile. Accordingly, in both isomerization processes, in particular, 2-methyl-3-butenenitrile is isomerized to linear 3-pentenenitrile. The troublesome compounds are preferably removed together with the Lewis acid.

ADVANTAGES OF THE INVENTION

The process according to the invention for preparing nickel (0)-phosphorus ligand complexes allows, in a simple manner, the preparation of mixtures comprising the complexes, said mixtures not comprising any Lewis acids. The Lewis acid-free catalyst may be used particularly advantageously in the hydrocyanation reactions and isomerization reactions.

In the extraction step d), a portion of the nickel(0) catalyst is recovered and can, in the case of circulation mode, be recycled back into the hydrocyanation and/or isomerization. As a result of this recycling, catalyst losses as a result of decomposition of the catalyst, as can occur to an increased extent in the case of relatively high reaction temperature of the hydrocyanation or isomerization, can be balanced out. This allows the hydrocyanation or isomerization to be carried out at relatively high temperature. This increases the reaction rate and the space-time yield, which is why significantly smaller reactors can be used.

The processes according to the invention for isomerizing branched nitrites can, in the event of suitable configuration of the extraction, also remove the troublesome components without additional cost and inconvenience together with the Lewis acids.

EXAMPLES

1) Preparation of the Nickel(II) Source:Anhydrous Nickel Chloride by Azeotropic Distillation In a 2000 ml round-bottomed flask equipped with stirrer and water separator, a solution of 30 g of nickel chloride hexahydrate ($NiCl_2.6H_2O$) in 60 g of water was admixed with 424 ml of 3-pentenenitrile. The biphasic mixture was heated to boiling under reflux, in the course of which the water was separated out. This gave an anhydrous, finely divided suspension of anhydrous nickel chloride in 3-pentenenitrile with a nickel chloride content of 3.85% by weight of $NiCl_2$.

2) Preparation of the Nickel(0)-Phosphorus Ligand Complex

A 500 ml round-bottomed flask which had been equipped with stirrer and reflux condenser and was purged continuously with argon gas was initially charged with 101 g of the nickel chloride suspension obtained under A) (corresponding to 30 mmol of $NiCl_2$), and 198 g (540 mmol) of tritolyl phosphite were added thereto, so that the molar P:Ni ratio was equal to 18:1. Subsequently, the mixture was heated to 80° C. with stirring, the amount of zinc powder specified in the table was added and the reaction mixture was stirred at 80° C. for 3.5 hours.

After cooling to 25° C., the content of active, complexed nickel(0) was determined on a sample of the reaction mixture by cyclic voltammetry as follows: for the electrochemical oxidation, the current-voltage curve was measured in a cyclic voltammetry analysis apparatus in standing solution against a reference electrode, the peak current proportional to the concentration was determined and calibration with solutions of known Ni(0) concentrations was used to determine the Ni(0) content of the sample. The Ni(0) values specified in the table indicate the content of Ni(0) in % by weight based on the overall reaction mixture (Rm) and determined by this method.

3) Extraction of the Reaction Mixture

For extraction, a separating funnel was initially charged with 15 g of the reaction mixture at 30° C. 15 g of adiponitrile and 30 g of n-heptane were added and the mixture was shaken intensively for 60 sec. Subsequently, the phase separation time was determined as the time span from the end of shaking (t=0) up to the formation of a uniform upper phase (heptane phase) and of a uniform lower phase (dinitrile phase). It is reported in the table.

The phases are separated from one another and the content in the phases of zinc chloride was determined by means of elemental analysis. It was found that the zinc chloride was present quantitatively in the lower phase (dinitrile phase).

TABLE

| Example | Mass of zinc powder [g] | Molar amount of zinc powder [mmol] | Molar amount of zinc:molar amount of $NiCl_2$ | Ni(0) content of the Rm [% by wt.] | Phase separation time |
|---|---|---|---|---|---|
| 1C | 1.0 | 14 | 1:2.1 | 0.22 | >12 h |
| 2C | 1.4 | 20 | 1:1.5 | 0.34 | 60 min |
| 3C | 1.7 | 24 | 1:1.25 | 0.40 | 10 min |
| 4 | 2.0 | 30 | 1:1 | 0.54 | <1 min |
| 5 | 3.2 | 45 | 1.5:1 | 0.54 | Spontaneous separation |

(C for comparison, Rm reaction mixture)

Comparative examples 1C to 3C show that, in the case of a noninventive molar ratio of zinc to nickel chloride of <1:1, i.e. zinc deficiency, the phase separation time was substantially longer than for an equimolar ratio (example 4) or a zinc excess (example 5).

What is claimed is:

1. A process for preparing nickel(0)-phosphorus ligand complexes which comprise at least one nickel(0) central atom and at least one phosphorus ligand comprising
   (1) reacting a nickel(II) compound with a reducing agent in the presence of said at least one phosphorus ligand to give a reaction mixture, wherein
      a) the molar ratio of said reducing agent to said nickel(II) compound ratio in said reaction mixture is in the range of from 1:1 to 1000:1, calculated as the molar ratio of the redox equivalents,
      b) the molar ratio of said at least one phosphorus ligand to said nickel(II) compound in said reaction mixture is less than or equal to 30:1, calculated as the molar P atoms:Ni atoms ratio, and
      c) the nickel(0) content in said reaction mixture is less than or equal to 1.3% by weight; and
   (2) extracting the resulting reaction mixture by adding at least one dinitrile and at least one hydrocarbon to form at least two immiscible phases.

2. The process of claim 1, wherein said molar ratio of said reducing agent to said nickel(II) compound ratio is in the ratio of from 1:1 to 5:1, calculated as the molar ratio of the redox equivalents.

3. The process of claim 1, wherein said nickel(II) compound is selected from the group consisting of nickel(II) halides and nickel(II)-ether adducts.

4. The process of claim 1, wherein said at least one phosphorus ligand is selected from the group consisting of phosphines, phosphites, phosphinites, and phosphonites.

5. The process of claim 1, wherein the source of said at least one phosphorus ligand is a ligand solution previously used as a catalyst solution in hydrocyanation reactions or isomerization reactions.

6. The process of claim 1, wherein said reducing agent is selected from the group consisting of metals which are more electropositive than nickel, metal alkyls, electrical current, complex hydrides, and hydrogen.

7. The process of claim 1, wherein said reducing agent is selected from the group consisting of zinc metal and iron metal.

8. The process of claim 1, wherein said process is carried out in a solvent selected from the group consisting of organic nitriles, aromatic hydrocarbons, and aliphatic hydrocarbons.

9. The process of claim 1, wherein one of said at least two immiscible phases is enriched with a nickel(0)-phosphorus ligand complex relative to the reaction mixture and further comprising (3) removing said immiscible phase enriched with a nickel(0)-phosphorus ligand complex.

10. The process of claim 1, wherein said at least one hydrocarbon is selected from the group consisting of cyclohexane, methylcyclohexane, cycloheptane, n-hexane, n-heptane, isomeric heptanes, n-octane, isooctane, isomeric octanes, cis-decalin, and trans-decalin.

* * * * *